Patented July 4, 1933

1,916,824

UNITED STATES PATENT OFFICE.

KARL BRAUS, OF OPPAU, GERMANY, ASSIGNOR TO I. G. FARBENINDUSTRIE AKTIEN-GESELLSCHAFT, OF FRANKFORT-ON-THE-MAIN, GERMANY

REMOVAL OF SULPHUR COMPOUNDS FROM GASES

No Drawing. Application filed August 27, 1930, Serial No. 478,307, and in Germany September 3, 1929.

The present invention relates to the purification of coke oven and illuminating gases from organic sulphur compounds.

It has already been proposed to remove organic sulphur compounds contained in industrial gases containing hydrogen, such as water gas, coke oven gas, oil gas and the like by passing said gases at elevated temperatures, for example from 300° to 400° C. over hydrogenating catalysts such as nickel, iron, copper, molybdenum, tungsten or catalysts containing the same, thus decomposing the organic sulphur compounds under the influence of hydrogen with a liberation of hydrogen sulphide, which may then be removed in the usual manner.

By the process described water gas and similar gases may be completely purified from organic sulphur compounds. However, unsatisfactory results are obtained when employing this process for the refinery of gases resulting from the distillation of solid fuels, such as coke oven gases or illuminating gases. Even when these gases are free beforehand in the usual manner from their content of benzene hydrocarbons, it is not possible by treating these gases with the above-mentioned hydrogenating catalysts, to reduce their content in organically combined sulphur to less than 20 or 40 milligrams per cubic metre gas. Since, however, such a content of sulphur in the gases is considerably impairing many catalytic reactions the above-mentioned purifying process which usually is employed only for rendering the gases useful for catalytic reactions, cannot be employed in these cases.

I have now found that the complete conversion of organically combined sulphur contained in gases resulting from the distillation of solid fuel, such as brown coal, mineral coal, which gases are usually called illuminating gas and coke oven gases, may be effected with the aid of hydrogenating catalysts at elevated temperatures if the said gases are freed before the catalytic treatment from unsaturated and higher molecular saturated hydrocarbons, especially those containing 5 carbon atoms and more in the molecule. For example by passing at from 300° to 400° C. over a catalyst consisting of molybdenum sulphide and chromic oxide a mixture of methane and hydrogen containing 30 grams of benzene and 1048 milligrams of thiophene (which corresponds to 400 milligrams of sulphur) per each cubic metre of gas, but which is free from other impurities, more than 399 milligrams of each 400 milligrams of the sulphur present in thiophene are converted into hydrogen sulphide. If, however, the same gas mixture is mixed with 1 per cent of olefines or hydrocarbons of the acetylene series and then treated under the same conditions, 30 to 40 milligrams of unchanged sulphur remain in each cubic metre of gas, though neither a smearing nor any formation of soot may be observed on the catalyst. In a similar manner, though not to so high a degree, the purifying treatment is disturbed by the presence of high molecular saturated hydrocarbons. By removing the said noxious hydrocarbons from coke oven gas or illuminating gas the organically combined sulphur may readily be converted into hydrogen sulphide by means of hydrogenating catalysts to such an extent that the resulting gas from which the hydrogen sulphide has been removed contains less than 1 milligram of sulphur per each cubic metre.

The removal of unsaturated and higher molecular saturated hydrocarbons from illuminating gas or coke oven gas may be effected by any of the usual methods, for example by washing with sulphuric acid of a medium or high concentration, for example with a 70 or more per cent sulphuric acid, or by washing the injurious hydrocarbons with washing oils, such as tar oils boiling between 200° to 300° C. or other absorbing liquids, for example tetrahydronaphthalene. Also active charcoal or active silica may be advantageously employed for the said purpose. Active charcoal and active silica absorb only for a short time also part of the organic sulphur compounds, but they are capable of absorbing for a long period of time those constituents of the gas which disturb the catalytic conversion of the organic sulphur compounds to hydrogen sulphide. When the absorption decreases the absorbing agents are regenerated in the usual manner. The active charcoal for example is regenerated by treatment with steam, the active silica by treatment with air at elevated temperatures.

The gases thus pretreated are then subjected to the action of a hydrogenating catalyst at an elevated temperature, preferably between 300° and 400° C. Catalysts comprising at least one of the metals chromium, molybdenum or tungsten are especially suitable as hydrogenating catalysts in the process according to the present invention. The hydrogen sulphide formed in the catalytic hydrogenating treatment may be removed from the gas in any suitable manner, for example by washing with alkaline liquids or by passing the gas over active carbon or the like.

The removal of the unsaturated and higher molecular saturated hydrocarbons from the gases as well as the subsequent treatment with hydrogenating catalysts may be effected at any pressure. It is, however, preferable to carry out the process at atmospheric pressure.

The following examples will further illustrate the nature of this invention, but the invention is not restricted to these examples.

Example 1

A coke oven gas freed from tar, ammonia and benzene in the usual manner, but containing still sulphur, is washed with a 84 per cent sulphuric acid and then passed at from 300° to 400° C. with a velocity of flow of 200 cubic metres per hour over 100 litres of a catalyst prepared by mixing equal parts of molybdic acid and chromic anhydride, drying, heating and reducing at from 400° to 500° C. After the washing treatment with sulphuric acid, the content of organically combined sulphur in the gas amounts to 251 milligrams and after the catalytic treatment and after removal of the hydrogen sulphide formed the gas contains less than 1 milligram of sulphur per each cubic metre. The waste sulphuric acid may be used for binding ammonia.

If the gases are not washed with sulphuric acid before the catalytic treatment the gases leaving the catalytic chamber contain 20 to 40 milligrams of organically combined sulphur per each cubic metre of gas.

Example 2

Illuminating gas freed from tar, ammonia, benzene and hydrogen sulphide is passed with a velocity of flow of 100 cubic metres of gas per hour through 2 cubic metres of active charcoal and then led at from 300° to 400° C. over 100 litres of a catalyst which is prepared by applying equal parts of molybdic oxide and nickel oxide on pumice. The gas leaving the active charcoal contains 298 milligrams of organically combined sulphur to each cubic metre of gas and after the catalytic treatment it contains less than 1 milligram of organically combined sulphur to each cubic metre of gas.

What I claim is:—

1. In the removal of organic sulphur compounds contained in a gas obtained by distillation of a solid fuel, the step which comprises freeing the said gas from unsaturated and higher molecular hydrocarbons and then treating it while heating to from 300° to 400° C. with a hydrogenating catalyst in the absence of nascent hydrogen.

2. In the removal of organic sulphur compounds contained in a gas obtained by distillation of a solid fuel, the step which comprises freeing the said gas from unsaturated and higher molecular hydrocarbons and then treating it while heating to from 300° to 400° C. with a catalyst comprising at least one of the metals selected from the group consisting of chromium, molybdenum and tungsten in the absence of nascent hydrogen.

3. In the removal of organic sulphur compounds contained in a gas obtained by distillation of a solid fuel, the step which comprises freeing the said gas from unsaturated and higher molecular hydrocarbons by washing it with sulphuric acid and then treating it while heating to from 300° to 400° C. with a hydrogenating catalyst comprising at least one of the metals selected from the group consisting of chromium, molybdenum and tungsten, in the absence of nascent hydrogen.

4. In the removal of organic sulphur compounds contained in a gas obtained by distillation of a solid fuel, the step which comprises freeing the said gas from unsaturated and higher molecular hydrocarbons by washing it with a washing oil and then treating it while heating to from 300° to 400° C. with a hydrogenating catalyst comprising at least one of the metals selected from the group consisting of chromium, molybdenum and tungsten, in the absence of nascent hydrogen.

5. In the removal of organic sulphur compounds contained in a gas obtained by distillation of a solid fuel, the step which comprises freeing the said gas from unsaturated and higher molecular hydrocarbons by passing it over active charcoal and then treating it while heating to from 300° to 400° C. with a hydrogenating catalyst comprising at least one of the metals selected from the group consisting of chromium, molybdenum and tungsten, in the absence of nascent hydrogen.

In testimony whereof I have hereunto set my hand.

KARL BRAUS.